United States Patent Office 3,113,283
Patented Dec. 3, 1963

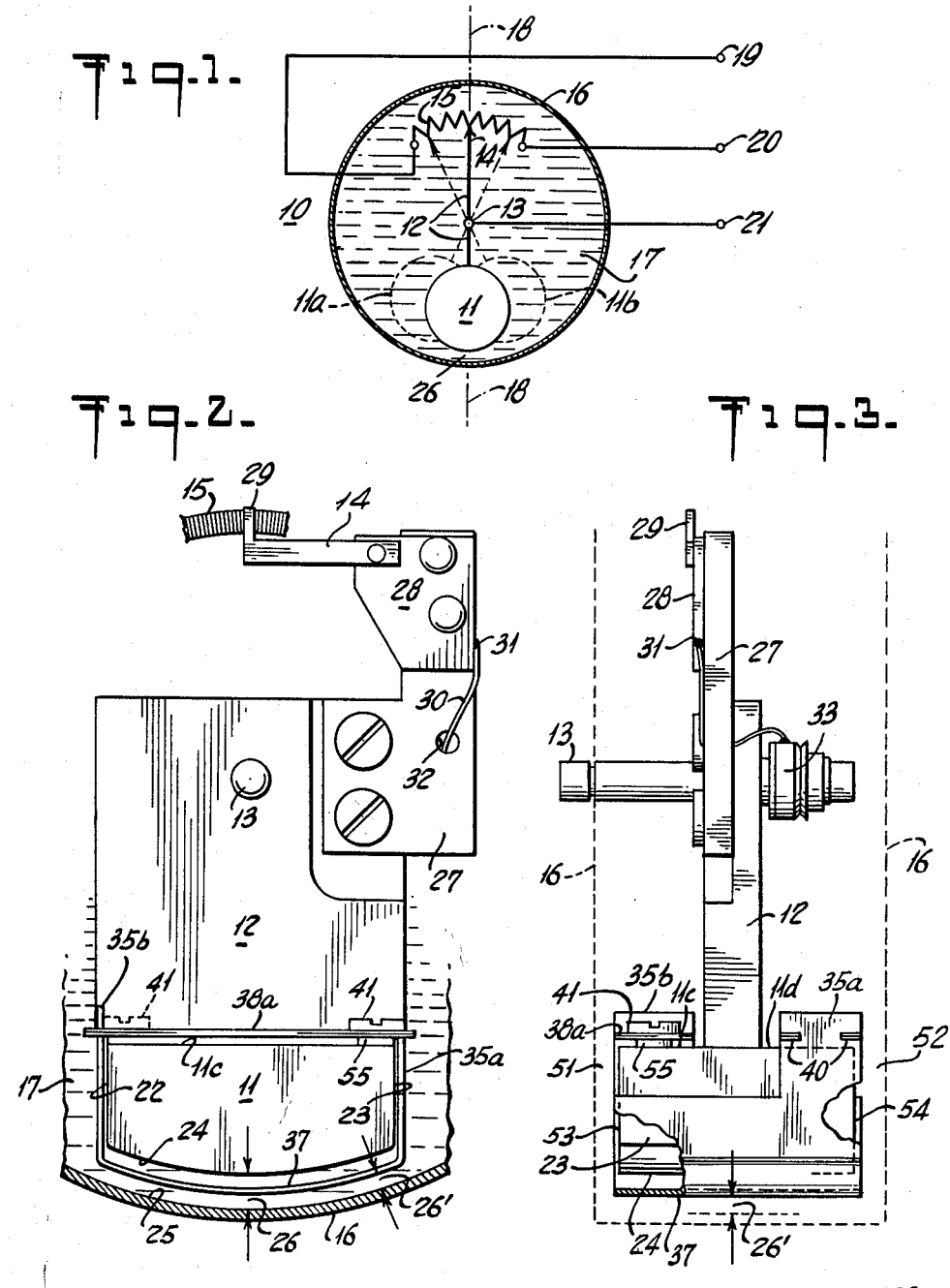

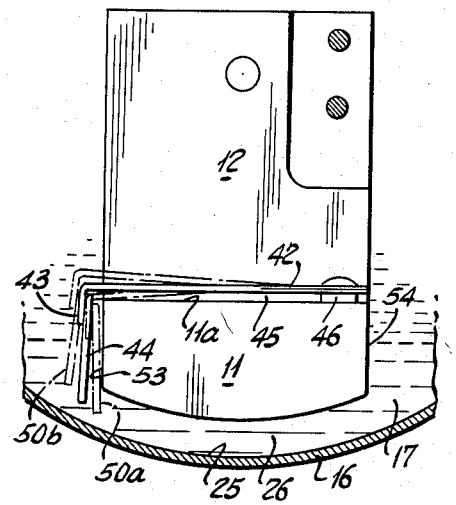
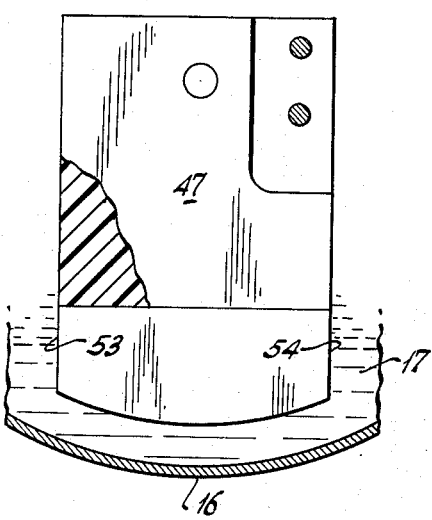
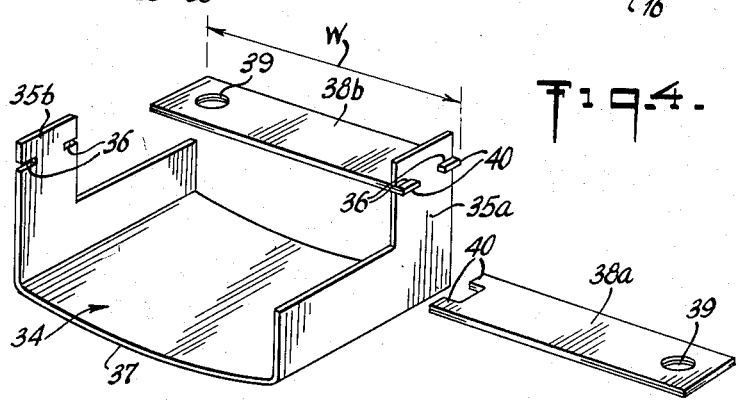
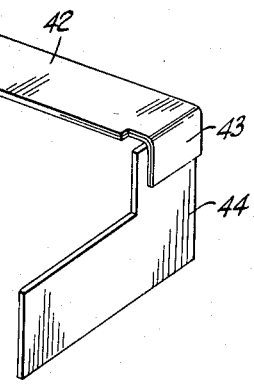

3,113,283
TEMPERATURE COMPENSATED PENDULUM POTENTIOMETER
Michel J. Fliegler, Commack, N.Y., Harold C. Pasini, Westwood, N.J., and Harold A. Spitzner, Centereach, and Robert P. Zupa, Hollis, N.Y., assignors to Analogue Controls, Inc., Hicksville, N.Y., a corporation of New York
Filed Oct. 26, 1962, Ser. No. 233,336
5 Claims. (Cl. 338—46)

The instant invention relates to an improved pendulum potentiometer and, in particular, relates to a viscously damped pendulum potentiometer incorporating temperature compensation means to establish uniform damping characteristics for a wide range of environmental temperature variations.

The pendulum potentiometer constitutes a simple and reliable device for sensing angular displacement by providing an electrical output signal directly in proportion to such displacement from a reference axis, such as a vertical plane. The pendulum potentiometer has many industrial uses in addition to the various military applications, in particular, with respect to land, marine vehicles and aircraft and space vehicles. For example, the device may be used to provide a reference proportional to angle of tilt in a tank to regulate a fire control system which requires correction because of the tank travelling over a graded incline. Road graders employ pendulum potentiometers to provide accurate on-the-spot indications of grading. Automatic coal drilling machines employ same to monitor the angle of drilling. Marine craft employ such devices to indicate pitch and roll. Similar application is made in aircraft vehicles and also in torpedo guidance systems and missiles.

As seen from the foregoing description, the pendulum potentiometer is basically an inclination sensing device. For accurate use in a servo system, the potentiometer is designed to provide a linear resistance change with respect to change of inclination. Accuracy and reliability of performance also requires high resolution and sensitivity and proper damping over a wide range of environmental conditions. The sensitivity characteristic basically refers to the relationship of the smallest incremental angular change which produces a change of electrical output. Inasmuch as the servo system operation is highly dependent upon the potentiometer, the potentiometer response should be substantially instantaneous and free of spurious oscillations as it provides its calibrated output with respect to inclination changes. In order to achieve such precision inclination sensing, the pendulum potentiometer movement is damped by a viscous fluid. Movement of the potentiometer mass is thus against a shearing force presented by the viscous fluid in order to suppress spurious oscillations and to maintain an established rate of change of voltage output for specified inclination changes. Once, a potentiometer is calibrated for operation, the precision and reliability of the device is nullified if the damping characteristics of the fluid varies by reason of temperature changes in the environment in which the pendulum potentiometer is used. The viscosity of the damping liquid changes with temperature variations, i.e. its viscosity decreases with temperature rise and conversely increase with a temperature drop. In other words, the fluid damping force decreases with a rise of temperature and conversely increases for a temperature drop.

It is the principal object of this invention to provide simple and reliable means for regulating the damping characteristics of a pendulum potentiometer to compensate against environmental temperature variations.

It is a further object of the invention to provide means for regulating the damping characteristics of a pendulum potentiometer to compensate for temperature variations, which means are readily adapted to standard pendulum potentiometers of known design so as to eliminate obsolescence of such potentiometers.

Further objects and advantages will become apparent from the following description of the invention taken in conjunction with the figures, in which:

FIG. 1 is a schematic illustration of a pendulum potentiometer and is set forth herein to facilitate the description of the invention;

FIG. 2 is a front elevation of a potentiometer arm and mass incorporating the features of the instant invention;

FIG. 3 is a side elevation taken along line 3—3 of FIG. 2;

FIG. 4 is an exploded perspective view of the compensating assembly of FIGS. 2 and 3;

FIG. 5 illustrates potentiometer means incorporating another embodiment of the invention;

FIG. 6 is a perspective view of the compensating assembly of the FIG. 5 embodiment; and FIG. 7 is an elevational view partially in section to depict a third embodiment of potentiometer arm and means for providing compensation.

Reference is made to the explanatory FIG. 1. The pendulum potentiometer 10 depicted therein consists of a viscously damped pendulum weight 11 suspended by a bearing supported arm 12. Arm 12 is depicted as rotatable about an axis of a shaft 13. A slider or contact wiper 14 is mounted on the opposite end of arm 12 and is designed for slidable contact along a potentiometer winding 15. Winding 15 is supported in the interior of and is an integral part of a hermetically sealed housing 16. Housing 16 contains a viscous damping fluid 17. A voltage is normally applied to potentiometer winding 15 at input terminals 19, 20. The output voltage is taken from terminals 20, 21.

As seen from FIG. 1, pendulum mass 11 is immersed in an electrically non-conductive fluid 17. In use of the instrument, housing 16 is normally fastened to the vehicle frame. Rotation or movement of the vehicle about the vertical reference 18—18 will change the relative position of wiper 14 with respect to winding 15 to produce a corresponding change in the output voltage picked up from terminals 20, 21. This is depicted by the displaced pendulum 11a for counterclockwise motion of housing 16 and 11b for clockwise motion of housing 16.

Reference is now made to FIGS. 2, 3 and 4 for a preferred embodiment of the invention. Potentiometer arm 12 is generally made of light weight material, such as aluminum. Arm 12 is supported by and keyed to shaft 13 to turn together. Shaft 13 is bearing supported by housing 16 to turn freely about the shaft axis. The enlarged mass 11 is mounted to hang from the lower end of arm 12. Mass 11 has front and back ledge surfaces 11c, 11d extending at right angles from arm 12. Mass 11 also has depending side walls 22, 23 and a radially curved bottom surface 24. Bottom surface 24 corresponds in shape to the radial curvature of the confronting housing inner surface 25 to define an arcuate gap or clearance 26 between the two closely spaced surfaces 24, 25. Since the curvatures of surfaces 24, 25 correspond, gap clearance 26 is a uniform size for all positions of arm 12 along its range of swing. As seen in FIG. 3, clearance gaps 51, 52 also appear between the front and back faces 53, 54 of mass 11 and the adjacent interior housing walls. Normally, pendulum arm movement is damped by the front, back and bottom mass faces 53, 54 and 24 causing a motion resisting "cutting or shearing force" in the body of liquid 17 contained in gaps 51, 52 and 26 as arm 12 swings back and forth about the shaft axis.

Arm 12 includes an upstanding bracket member 27 bolted thereto. A second bracket member 28 is bolted to the upper end of bracket 27. A conductive wiper element 14 is suitably aligned and mechanically secured by soldering or other means to upper bracket member 28. Bracket member 28 is made of electrical conducting material. The outer end 29 of wiper element 14 is arranged to slide along potentiometer winding 15. The electrical continuity from terminal 20 to wiper element 14 includes the connection from wiper 14 to member 28 and a lead wire 30 soldered at 31 to member 28. Wire 30 extends through a hole 32 in bracket member 27 to a collector ring 33 fixed to shaft 13. The remainder of the circuit to terminal 20 is taken from ring 33 by conventional and known techniques to complete connection to terminal 20 outside of housing 16.

The basic concept of the instant invention involves narrowing and widening one or more of the clearance gaps so as to increase and decrease, respectively, the frictional shearing force developed within the "molecular layers" of the fluid in such gap or gaps as arm-weight 11 swings. This off-sets fluid viscosity changes due to a temperature change. It has been found that reliable temperature compensation may be realized by decreasing the "frictional shearing force" to off-set an increase in viscosity which compensates for a temperature drop, and conversely, increasing the "frictional shearing force" off-sets a decrease in viscosity due to a temperature rise, whereby damping over a wide range of temperatures is held relatively constant. The illustrated embodiment contemplates varying gap clearance 26' to carry out the foregoing, i.e. increasing the size of gap 26' for a temperature drop and decreasing the gap size 26' for a temperature rise. Regulation of the size of gaps 51, 52 may be used as an alternative method for providing temperature compensation or may be used in conjunction with regulation of gap 26'.

The compensating assembly, FIG. 4, involves a U-shaped damped body 34 stamped out of brass or other suitable material. Body 34 has opposed upstanding side walls 35a, 35b. Walls 35a, b have diagonally disposed upper arms each provided with lateral slots 36. Walls 35a, b are joined by a radial bottom wall 37 shaped to correspond with radial surface 25. The remainder of the damper assembly includes a pair of similar bi-metal rectangular spring-like laminated plates 38a, b each provided with a hole 39 at one end and a recess for forming projecting lips 40 at the opposite ends. The damper assembly is mounted over the underneath of mass 11 and secured thereto by bolting each plate 38a, b by bolts 41 to an opposite mass ledge 11a, b, while lips 40 of each plate register in respective wall slots 36. This arrangement holds body 34 around mass 11. It will be noted the symmetry of the compensating damper assembly consisting of body 34 and plates 30a, b does not off-set or shift the center of gravity of the pendulum from its vertical axis. Essentially, the illustrated compensating assembly is cantilever supported at the bolted ends of plates 38a, b to allow for uniform up and down movement of wall 37 toward and away from surface 25.

Plates 38a, b are thermostat metal, that is to say, a strip made up of two or more laminate metals permanently bonded together, wherein the layers have different coefficients of thermal expansion. Hence, plates 38a, b are relatively flat at a specified temperature and will change its curvature when subject to a temperature change. Thermostat metal is available in the market place, for example, it is sold by General Plate Division of Metals and Controls Corporation, Attleboro, Massachusetts under the trademark "Truflex." FIG. 2 depicts the assembly with plates 38a, b in a relatively flat status, for example, the setting for room temperature. A washer 55 between each bolted plate 38a, b and the correlated support ledge 11c, d provides a flexing clearance to permit downward flexing of plates 38a, b upon a temperature rise above room temperature. It will be noted that body curved wall 37 extends in a curved plane between mass surface 24 and housing surface 25, whereby the size of gap clearance is now effectively reduced to 26'. At no time is body wall 37 permitted to contact housing surface 25. Plates 38a, b are mounted so that the free ends thereof, i.e. the ends having lips 40, flex downwardly to lower the curved body wall 37 uniformly along its length (to narrow further gap clearance 26') upon a temperature rise. This action increases the effective frictional "shearing force" in gap 26' to off-set the viscosity decrease. Conversely, a temperature drop causes an upward flexing of plates 38a, b to increase the gap clearance 26' to compensate for a temperature drop.

The foregoing movement of the compensating assembly requires that the size of the assembly components be such so as to permit such movement with ease in response to temperature changes. For example, body wall 37 is spaced below mass wall 24 to provide movement clearance, the width "W" (FIG. 4) between the confronting faces of body side walls 35a, b is slightly greater than the corresponding width of mass 11 to prevent binding; and the length of plates 38a, b is such that the lip ends thereof overlap beyond the adjacent edges of mass ledges 11a, b as seen in FIG. 2.

It is also noted that incorporation of the foregoing described compensating assembly does not require any change to the pendulum potentiometer, except for tapped holes to bolt plates 38a, b to ledges 11c, d. Hence, the assembly may be employed in prior art pendulum potentiometers to prevent such devices from becoming obsolete.

FIGS. 5 and 6 illustrate a modified embodiment of the invention, wherein the compensating damper assembly is made up of a bi-metal thermostat plate 42 cantilever supported at one end by bolt means to one ledge 11a of pendulum mass 11. The outer free end 43 of plate 42 overlaps beyond the adjacent end of mass ledge 11a to permit up and down movement of same. Plate end 43 is bent downwardly and a vertical baffle plate 44 of brass is welded thereto to extend into the region of the fluid filled gap clearance 26. The solid outline (FIG. 5) depicting the assembly shows plate 42 in unstressed status, that is to say, plate 42 is substantially flat and straight at a specified temperature. A vertical clearance 45 is maintained between the flat straight plate 42 and the top of ledge 11c by a washer 46. When temperature increases, plate 42 flexes downwardly to move as depicted by the dashed outline 50a to off-set a decrease of viscosity. Such motion causes baffle plate 44 to advance further into clearance gap 26, but without touching housing surface 25. Conversely, when temperature increases above the specified temperature, thermostat plate flexes upwardly to move baffle plate 44 in a direction to increase clearance gap 26 as depicted by 50b. A similar and second compensating damping structure also may be attached to the other mass ledge 11b and preferably with the bolted end thereof located diagonally with respect to the bolted end of plate 42.

FIG. 7 illustrates another embodiment of the invention, wherein the compensating damper assembly involves a pendulum arm 47 made entirely of "Teflon" (polytetrafluoroethylene), but otherwise dimensioned and shaped as a standard arm 12. It has been discovered that "Teflon" has a coefficient of thermal expansion which causes the arm to expand in response to temperature rise, whereby arm 47 becomes longer to lower mass 11 so as to reduce uniformly the size of clearance gap 26 to off-set a decrease of viscosity. Conversely, "Teflon" arm 47 shortens in response to a temperature drop to off-set an increase of viscosity. The foregoing action also introduces compensation by changing the frictional shearing force developed in the "molecular layers" of the fluid contained in gap 26 as arm 47 swings back and forth about the shaft axis to bring about the desired compensation. The prior-mentioned embodiments of FIGS. 1 through 6 are preferable because they provide a stable correction characteristic, whereas "Teflon" tends to be unstable physically and thus arm 47 requires periodic adjustment or replacement. Although the FIG. 7 embodiment specifies "Teflon," other materials having characteristics of large thermal coefficient of linear expansion may be used in lieu of "Teflon."

It is intended that all matter contained in the above description or shown in the accompanying drawings shall be interpreted as illustrative and not in a limiting sense.

What is claimed is:

1. A pendulum potentiometer incorporating temperature variation compensation comprising, an enclosed housing, a resistor winding supported in said housing, pendulum means supported in said housing for pivoting about a given axis and having wiper means electrically in contact with said winding to provide a voltage corresponding to the pivotal position of said pendulum means, a damping fluid in said housing for damping out spurious pendulum oscillations as said pendulum means swings about said axis, said pendulum means also including a weight at one end thereof, said weight being immersed in said fluid, the separation between said weight and adjacent confronting portion of said housing surface defining a clearance gap containing said fluid, means operationally cooperating with said pendulum means for regulating the effective separation of said clearance gap to regulate the damping of said pendulum means, said operationally cooperating means having a thermal coefficient of linear expansion for narrowing and widening the effective size of said gap in response to an increase and decrease in fluid temperature to off-set a resulting change in fluid viscosity to maintain a relatively constant fluid damping effect regardless of a rise and drop of temperature, operationally cooperating means comprising a pendulum arm made of "Teflon."

2. A pendulum potentiometer incorporating temperature variation compensation comprising, an enclosed housing, a resistor winding supported in said housing, pendulum means supported in said housing for pivoting about a given axis and having wiper means electrically in contact with said winding to provide a voltage corresponding to the pivotal position of said pendulum means, a damping fluid in said housing for damping out spurious pendulum oscillations as said pendulum means swings about said axis, said pendulum means also including a weight at one end thereof, said weight being immersed in said fluid, the separation between said weight and adjacent confronting portion of said housing surface defining a clearance gap containing said fluid, means operationally cooperating with said pendulum means for regulating the effective separation of said clearance gap to regulate the damping of said pendulum means, said operationally cooperating means having a thermal coefficient of linear expansion for narrowing and widening the effective size of said gap in response to an increase and decrease of fluid temperature to off-set a resulting change in fluid viscosity to maintain a relatively constant fluid damping effect regardless of a rise and drop of temperature, said operationally cooperating means including first and second thermostat plates and each plate being cantilever supported at one end from opposite sides of said pendulum means, each plate also having a free end overlapping beyond said pendulum means for selected movement in response to temperature variations, and means including a substantially U-shaped baffle member having opposed side walls, respective ones of said side walls being attached to individual ones of said plate free ends, said U-shaped member also having a web joining said side walls and extending along said clearance gap, said web being spaced from said housing surface and said pendulum means, movement of said plate free ends causing corresponding movement of said U-shaped member to effect a change of frictional shearing force in said gap to off-set a fluid viscosity change due to temperature variations.

3. In a pendulum potentiometer having an enclosed housing supporting a resistor winding therein, said potentiometer also having a pendulum arm supported in said housing for pivoting about an axis and having a wiper means electrically in contact with said winding to provide a voltage corresponding to the pivotal position of said pendulum arm, the combination incorporating temperature variation compensation comprising, a damping fluid in said housing for damping out spurious pendulum oscillaations, a pendulum weight at one end of said pendulum arm, said weight being immersed in said fluid and said weight being spaced from the interior wall of said housing to define a clearance gap to permit pendulum swing, said arm being made of "Teflon" having a thermal coefficient of linear expansion for narrowing and widening the effective size of said gap in response to an increase and decrease of fluid temperature to off-set a resulting change in fluid viscosity to maintain a relatively constant fluid damping effect regardless of a rise and drop of temperature.

4. In a pendulum potentiometer having an enclosed housing supporting a resistor winding therein and also having a pendulum arm supported in said housing for pivoting about an axis and having wiper means electrically in contact with said winding to provide a voltage corresponding to the pivotal position of said arm, a damping fluid in said housing for damping out spurious pendulum oscillations, a pendulum weight at one end of said arm, said weight being immersed in said fluid and the separation between said weight and adjacent housing surface defining a clearance gap to permit pendulum swing, said gap containing said fluid, the combination incorporating temperature variation compensation comprising, thermostat means supported by said pendulum weight and having free ends extending from opposite sides of said weight for flexing in selected directions in response to an increase and decrease of fluid temperature respectively, and a substantially U-shaped baffle member mounted over said weight, said baffle member having opposed sides supported from the respective ones of said free ends and an interconnecting web joining said opposed sides, said web extending along said gap, said gap is effectively narrowed and widened in accordance with flexing of said thermostat means to off-set a change in fluid viscosity to maintain a relatively constant fluid damping effect regardless of a rise and drop of temperature.

5. In a pendulum potentiometer having an enclosed housing, a resistor winding supported in said housing, a pendulum arm supported in said housing for pivoting about a given axis and having wiper means electrically in contact with said winding to provide a voltage corresponding to the pivotal position of said arm, a damping fluid in said housing for damping out spurious pendulum oscillations, a pendulum weight at one end of said arm, said weight being immersed in said fluid, the separation between said weight and adjacent housing surface defining a clearance gap to permit pendulum swing, said gap containing said fluid, the combination incorporating temperature variation compensation comprising, first and second thermostat means symmetrically supported from opposite sides of said pendulum weight and each having a free end extending beyond said pendulum weight for movement in selected directions in response to an increase and decrease of fluid temperature respectively, baffle means surrounding said pendulum weight and having opposed sides attached to individual ones of said thermostat means free ends, said baffle means also having a web joining said side walls and extending along said clearance gap, said web being spaced from said housing surface and said pendulum weight, movement of said thermostat means free ends causing corresponding movement of said baffle means, said gap is effectively widened and narrowed in accordance with such movement to off-set a fluid viscosity change due to temperature variations, whereby a relatively constant fluid damping effect is maintained regardless of a rise and drop of temperature.

References Cited in the file of this patent
UNITED STATES PATENTS

| | | |
|---|---|---|
| 2,857,149 | Bourns et al. | Oct. 21, 1948 |
| 2,903,665 | Davis | Sept. 8, 1959 |
| 3,010,324 | Pitzer et al. | Nov. 28, 1961 |